US008855020B2

(12) United States Patent
Marchetti et al.

(10) Patent No.: US 8,855,020 B2
(45) Date of Patent: Oct. 7, 2014

(54) AUTOMATICALLY MAXIMIZING NETWORK LINK UTILIZATION USING VIRTUAL NETWORKS

(75) Inventors: Michael Frank Marchetti, Cambridge (CA); David Cameron Dolson, Waterloo (CA)

(73) Assignee: Sandvine Incorporated ULC, Waterloo, Ontario (CA)

( * ) Notice: Subject to any disclaimer, the term of this patent is extended or adjusted under 35 U.S.C. 154(b) by 619 days.

(21) Appl. No.: 11/650,925

(22) Filed: Jan. 9, 2007

(65) Prior Publication Data
US 2008/0165704 A1 Jul. 10, 2008

(51) Int. Cl.
 H04L 12/28 (2006.01)
 H04L 12/46 (2006.01)
 H04L 12/753 (2013.01)
 H04L 12/721 (2013.01)
(52) U.S. Cl.
 CPC .......... *H04L 12/4641* (2013.01); *H04L 45/48* (2013.01); *H04L 45/12* (2013.01)
 USPC ...................................................... 370/256
(58) Field of Classification Search
 CPC ..... H04L 45/48; H04L 45/02; H04L 41/0803; H04L 41/12; H04L 12/4641
 USPC ...................................................... 370/256
 See application file for complete search history.

(56) References Cited

U.S. PATENT DOCUMENTS 6,697,349 B2  2/2004  Mathis et al.
6,868,071 B1*  3/2005  Jensen et al. ............. 370/256
6,937,576 B1*  8/2005  Di Benedetto et al. ........ 370/256
7,760,668 B1*  7/2010  Zinjuvadia .................... 370/256
2008/0144533 A1*  6/2008  Bulusu et al. ................. 370/256
2008/0275975 A1*  11/2008  Pandey et al. ................. 709/223

OTHER PUBLICATIONS

Article entitled "Improving Load Balance and Resilience of Ethernet Carrier Networks with Multiple Spanning Tree Protocol" by Amaro F. de Sousa, Institute of Telecommunications, University of Aveiro, 3810-193 Aveiro, Portugal asou@det.ua.pt.
Canadian Intellectual Property Office, Office Action, Canadian Patent Application No. 2 573 495, Jul. 20 2010, Canada.
Canadian Intellectual Property Office, Office Action dated Aug. 4, 2011, Canadian Patent Application No. 2 573 495, Quebec Canada.
Canadian Intellectual Property Office, Office Action dated Oct. 19, 2012, Canadian Patent Appln No. 2573495.

* cited by examiner

*Primary Examiner* — Chirag Shah
*Assistant Examiner* — Jenkey Van
(74) *Attorney, Agent, or Firm* — Borden Ladner Gervais LLP; Neil Henderson

(57) ABSTRACT

A system and method for automatically configuring a network so that each switch in the network is aware of the Multiple Spanning Tree Instances (MSTI) of each other switch and the Virtual Local Area Network (VLAN) that each switch uses. This is achieved through the use of controllers connected to each switch. A master switch is elected and the master switch monitors messages to determine if a switch should be using an alternative MISTI. If so, the master switch instructs a switch to use an alternative MSTI. Either a switch or a node connected to the switch may determine which VLAN to use in sending messages, subject to configuration from the controller of the master switch. Messages are periodically sent by each controller to educate other controllers to aid in learning which node is part of a group connected to a switch, the switch in turn connected to a controller.

12 Claims, 4 Drawing Sheets

US 8,855,020 B2

AUTOMATICALLY MAXIMIZING NETWORK LINK UTILIZATION USING VIRTUAL NETWORKS

FIELD OF THE INVENTION

The present invention relates generally to a system and method for automatically configuring Multiple Spanning Tree Instance (MSTI) capable switches in a network.

BACKGROUND OF THE INVENTION

In a Local Area Network (LAN) of computing nodes, connections are formed via switches and links. It is desirable that frames take the shortest route—traversing the fewest number of switches and links—from one node to another. It is also desirable to create a redundant system in which there is an alternative communication path in the event of failure of any switch or link.

A Virtual LAN (VLAN) is a method of creating several independent LANs that share the same set of links, i.e. physical wires. Frames are marked by the sender so that the receiver knows which VLAN the frame belongs to. A VLAN may incorporate a subset of all the links in a LAN for the purpose of restricting traffic to a certain set of nodes in the LAN. VLANs also serve to provide alternative paths should some switches or links become unavailable.

Ethernet is a well known standard LAN technology. In an Ethernet LAN, every node has a unique address. Frames are sent from one node to another by directly addressing the destination node. Each frame also contains the source address (analogous to a postal return address). Frames may also be broadcast, meaning all nodes on the LAN receive them. Ethernet switches learn about nodes by observing the source addresses of frames received by the switches, after which frames addressed to a learned address can be delivered.

Ethernet supports VLANs with a standard way of tagging frames. A tag is also known as a VLAN Identifier (VID). A link carrying VLAN tagged frames is known as a trunk link.

The desire for redundancy and bandwidth leads to creating a network with multiple possible paths for a frame to get from one node to another. However, there must not be loops (cycles) in the network topology or broadcast frames would be replicated and cycled indefinitely. The well known spanning tree protocol was developed for Ethernet LANs to ensure that no such cycles exist by disabling redundant links.

A spanning tree is a computer science notion. It is a tree that includes all nodes of a graph. In other words, it is a connectivity scheme that has only one possible path from any one node to any other. A Spanning Tree Protocol, (STP) as defined in IEEE802.1D is a protocol for determining the spanning tree for the nodes of an Ethernet network. STP restricts the topology of the network so that the path from the "root" to any other node traverses the least possible number of nodes. A Multiple Spanning Tree (MST) is defined in IEEE802.1Q-(2003 edition). Each MST provides a set of unique spanning trees which each define a specific path between each pair of nodes, each one of which is referred to as a Multiple Spanning Tree Instance (MSTI) Any number of VLANs can be assigned to each MSTI of a spanning tree. Within any MSTI the shortest path exists from the root node to any other node.

MST configuration is difficult and error prone, as the same information must be configured on each switch in the LAN or else the scheme will fall back to rapid spanning tree (RST, 802.1D-2004) or simply spanning tree (802.1d).

Thus there is need for an automated mechanism to maximize link utilization other than typical routing and switching with arbitrary spanning tree behavior.

SUMMARY OF THE INVENTION

The present invention relates to automatically configuring a network. One aspect of the present invention is a network system, the system comprising:
a) a plurality of switches, connected to each other in a network;
b) a plurality of groups of nodes each group connected to one of the switches; and;
c) a controller for each switch; each controller configured to select a master controller and to configure the switch it controls to utilize a specific MSTI.

In another aspect of the present invention there is provided a method for determining an MSTI to be used by a switch in a network the method comprising the steps of:
electing a master controller; and
configuring switches in the network as to which MSTI to use based upon information provided from the master controller.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

Figure 1:
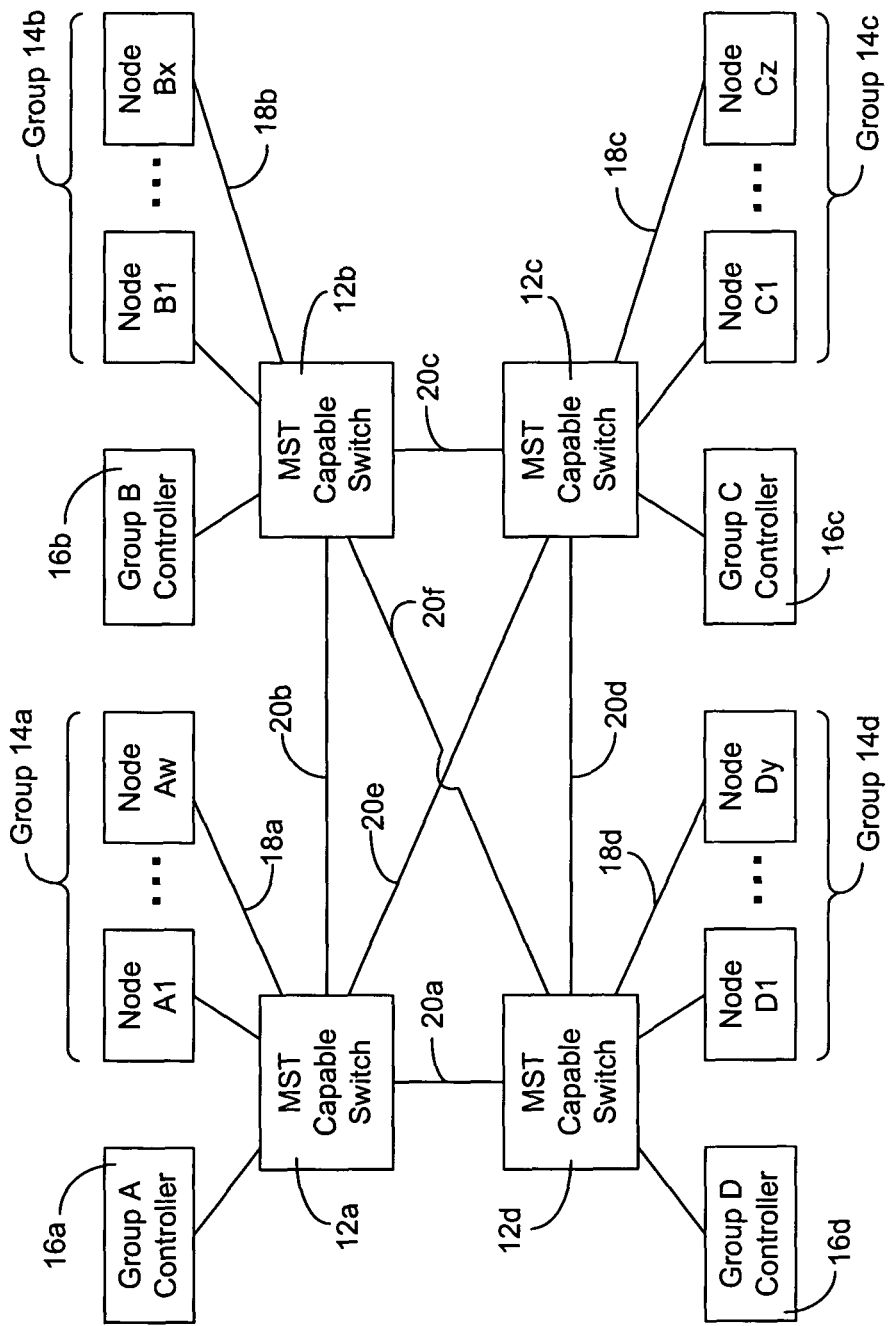
FIG. 1 is a block diagram of a computer network in which groups of nodes are connected to each other via MST capable switches.

Referring first to FIG. 1 a block diagram of a computer network in which groups of nodes are connected to each other via MST capable switches is shown. The MST capable switches are shown as features 12a, 12b, 12c and 12d (hereinafter referred to as switch or switches). Examples of groups of nodes connected to switches are shown as features 14a, 14b, 14c and 14d. An individual node in such a group or combination thereof will hereinafter be referred to as node or nodes. All nodes may communicate with each other at layer 2 of the Open Systems Interconnection Reference model, by addressing the destination node by Ethernet Media Access Control (MAC) address.

Each switch has a corresponding controller shown as features 16a, 16b, 16c and 16d respectively and are hereinafter referred to as a controller or controllers. The controllers configure the switches and are where in one embodiment, the present invention resides.

In the example configuration shown in FIG. 1, nodes communicate through two types of trunk links, specifically:
1) Local Ethernet trunk links such as 18a, 18b, 18c and 18d which are utilized by a node connected to a single switch and;

2) Ethernet trunk links such as 20a, 20b, 20c, 20d, 20e and 20f which connect switches in the network.

Traffic between individual nodes can take one of several paths, but for optimal trunk link utilization the path passing through the fewest number of trunk links and switches is desired.

Figure 2:
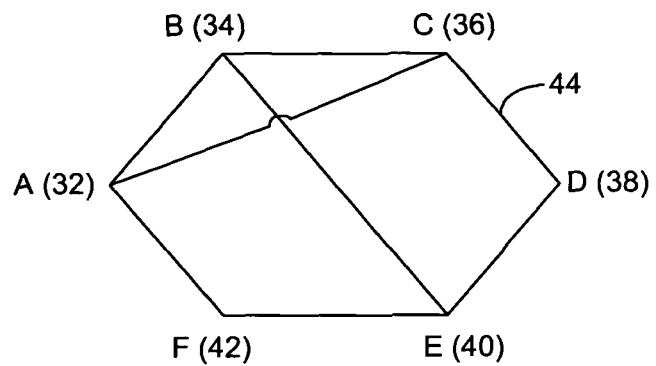
FIG. 2 is a schematic diagram of a LAN.
Figure 2A:
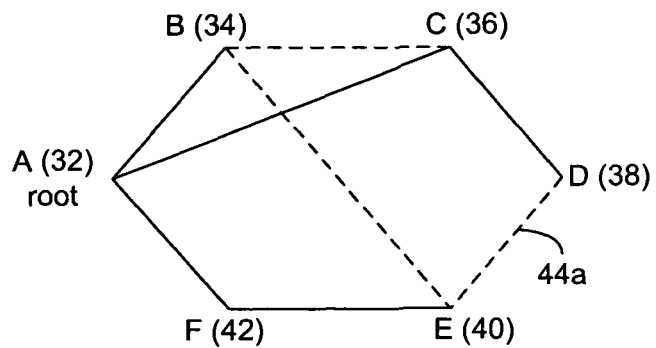
FIGS. 2A and 2B are schematic diagrams of spanning trees for the LAN of FIG. 2.
Figure 2B:
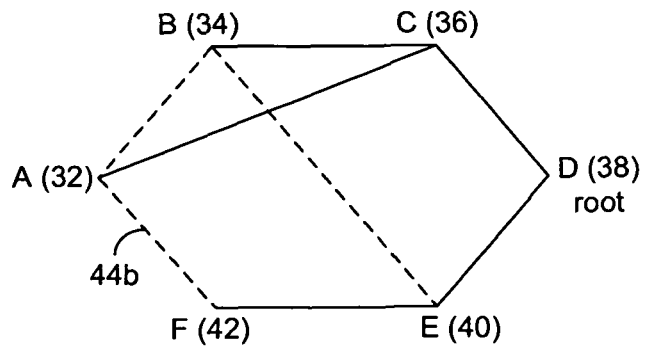

To aid the reader in understanding the concept of spanning trees we now refer to FIGS. 2, 2A and 2B. FIG. 2 is a schematic diagram of a LAN and FIGS. 2A and 2B are schematic diagrams of spanning trees for the LAN of FIG. 2. The spanning tree selected by a switch is based upon the VLAN tag in a frame.

Beginning with FIG. 2, a LAN having six switches, A through F are shown as feature numbers 32 through 42. Hereinafter we will refer to the switches as A to F, rather than by feature numbers for simplicity. Each switch is connected to another switch by a trunk line 44 (only one of which is labeled for readability).

FIG. 2A illustrates a spanning tree having the root on switch A. In this instance of a spanning tree the links between A and B, A and C, A and F, F and E and C and D are active. In contrast the links B and E, B and C, and D and E are inactive. These inactive links are shown as dashed lines and exemplified by feature 44a. Thus any switch in the network will only route frames for the active links in the spanning tree. For example to send a frame to switch E from root A, the frame travels from A to F to E.

Similarly FIG. 2B illustrates a spanning tree having the root on switch D. In this instance of a spanning tree the links between A and C, B and C, C and D, D and E, and E and F are active. In contrast the links A and B, A and F and B and E are inactive. These inactive links are shown as dashed lines and exemplified by feature 44b. For example to send a frame from root D to switch B, the frame travels from D to C to B.

As can be seen by the above examples of FIGS. 2A and 2B, the use of multiple spanning trees provides a shortest path to any other switch while providing the redundancy of MST instances.

In a first embodiment, the switches are source learning Ethernet switches supporting VLAN tagging and multiple spanning trees. The switch connected to a node selects the VLAN when sending frames. In this embodiment the node is not capable of VLAN tagging and trunking.

In a second embodiment a node selects the VLAN to utilize when sending frames. In this embodiment, the controller for the group communicates the tagging information to each node in the group. This embodiment allows the nodes to differentiate traffic by applying different tags, permitting the assignment of multiple VLAN tags to each MSTI for the purpose of providing separation of traffic onto different VLANs.

The present invention adds control functionality through the use of controllers (e.g. 16a) to automatically configure the switches for the purpose of providing connectivity between all nodes optimally utilizing trunk links between the switches. The controllers automatically enable multiple instances of spanning trees and configure VLAN tagging policy within each switch.

In the present invention all switches support the multiple spanning tree (MST) protocol. The end goal of automatic configuration is to have:

a) all switches in the same MST region;
b) each switch as the root node of its own MST instance (MSTI);
c) each MSTI having a unique tag for use by the switch for sending traffic;
d) each switch or node configured to tag all frames leaving its group with the unique tag; and
e) each switch configured to receive frames on a trunk link tagged with any tag of any of the other switches and to remove that tag if traffic is destined to a node in its group.

Once unique MSTIs and tags are decided and allocated it is straightforward to create the above configuration. The allocation is done by a master controller (i.e. one of 16a, 16b, 16c or 16d). This master controller can be pre-configured as such or automatically negotiated. Designating a master controller has the advantage of only requiring configuration of one controller but has the drawback of system failure if that one controller fails. If a master controller is automatically negotiated, all controllers need access to the same configuration to allow for any of the controllers to be elected.

Figure 3:
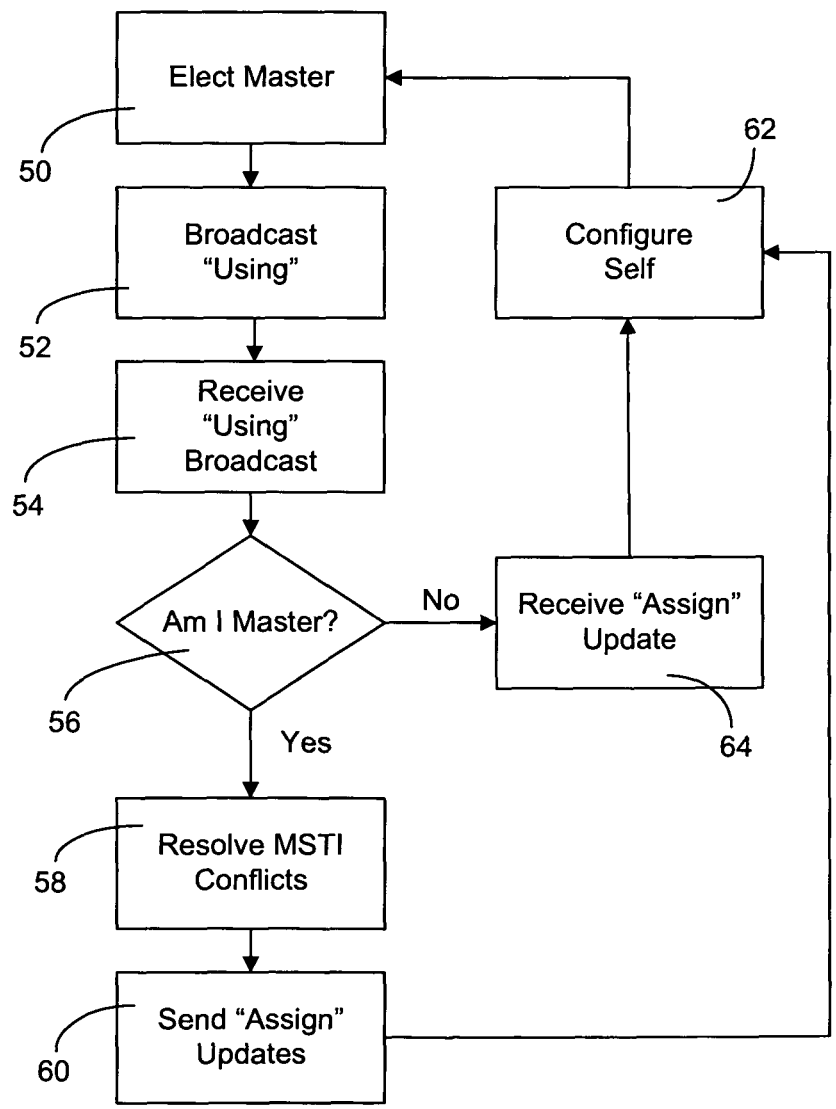
FIG. 3 is a flowchart of the steps of electing a master controller and configuring switches.

Referring now to FIG. 3 a flowchart of the steps of electing a master controller and configuring switches is shown. Beginning at step 50, the master controller is elected to utilize one switch. Any master election scheme may be used; in one embodiment the master controller is elected deterministically so that the same master is always elected from a given group of controllers. This may be determined by selecting a master controller from all connected controllers based upon the lowest serial number XORed with a predetermined constant. In another embodiment the master controller may be negotiated in a non-deterministic way, for example by voting. Further embodiments may provide the ability for a controller to not be part of the election if it is too busy. The master controller is responsible for assigning a MSTI to each controller (including itself).

Each controller retains a persistent copy of their assignments for use after power loss or other type of restart. Controllers use this assignment prior to any assignment by the master controller. Typically each controller will be using a different assignment but even in the case when two controllers use the same assignment this is not an error condition, merely sub-optimal. An assignment is defined as the root MSTI and its associated VLAN tag(s).

At step 52, each controller periodically sends a broadcast message to all other controllers, the broadcast message indicating which MSTI the switch associated with the controller is using. This allows each controller to configure its switch with the MSTIs other switches are using.

At step 54 each controller waits a predetermined amount of time to receive one or more using messages.

At step 56 each controller upon receiving a using message, tests to see if it is the master controller. If that is the case processing moves to step 56 where the master controller resolves any MSTI conflicts that may be present. Processing then moves to step 60 where the master controller sends an "assign" message to each of the other controllers if any conflicts between MSTI assignments have been detected at step 58. The master controller may also update its own MSTI assignment. Processing them moves to step 62 where the master controller reconfigures its switch. Processing then returns to step 50 where a master controller is elected.

Returning to step 56 if a "using" message has been received by a non-master controller, processing moves to step 64 where the controller waits to receive an "assign" message. Once such a message is received processing moves to step 62 where the non-master controller reconfigures its switch. Processing then returns to step 50 where a master controller is elected.

The process shown in FIG. 3 need not run continuously. In one embodiment it may be invoked on a regular basis at a predetermined interval.

With regard to the format of "using" and "assign" messages, they are identical save for a header that indicates the type of message. A message sent by the master controller to each other controller contains:

a) a header identifying the message type (i.e. using or assign).
b) MST region.
c) MSTI for the group of nodes connected to each switch.
d) VLANs for the MSTI of the group.
e) List of all MSTIs and corresponding VLANs. Thus each controller for each switch is aware of all MSTIs and VLANs.

If the case of a broken link the switches implementing the MST protocol detect the broken link and form a new spanning tree for each MSTI. Controllers are not involved or aware of this issue. In the case of multiple broken links the switches and controllers could become isolated from each other and act independently, each selecting their own master controller.

All controllers continue to use previously assigned MSTIs and VLANs while a new master controller is being elected. Hence, master controller failure does not affect the entire system. Because the new master controller will listen to the broadcasts from each controller, it will not change assigned parameters. Parameters need only be reassigned when a new switch joins the network and its default MSTI and VLAN are being used by another. It is not even a serious problem if multiple switches use the same MSTI and VLAN because MST and communication will still work; it is merely a less efficient use of links.

Figure 4:
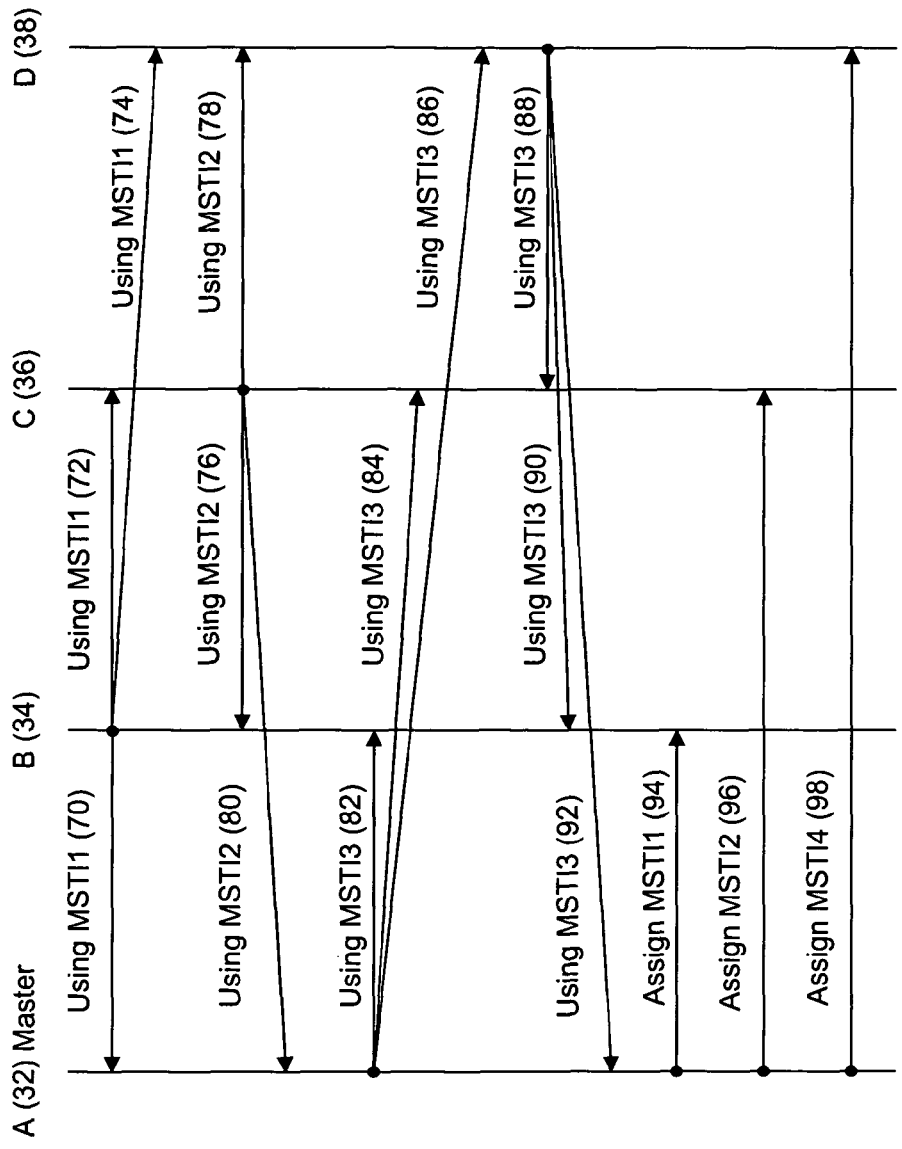
FIG. 4 is a sequence diagram of message flow between controllers.

Referring now to FIG. 4 a sequence diagram of message flow between controllers is shown. The controllers are responsible for sending and receiving the messages. In the example of FIG. 4 we illustrate "using" (broadcast) messages and "assign" (direct) messages that may flow between controllers A, B, C and D (features 32, 34, 36 and 38 respectively). In the example shown controller A is the master controller. Each controller periodically sends using messages to all other controllers it is aware of. Features 70, 72 and 74 indicate "using" messages from controller B to controllers A, C and D, respectively indicating controller B is using MSTI1. Similarly features 76, 78, and 80 indicate that controller C is using MSTI2. Features 82, 84, and 86 indicate that master controller A is using MSTI3. Controller D through the use of messages 88, 90 and 92 indicates it is using MSTI3. This is a conflict with the controller A which is using MSTI3 as well. As a result master controller A sends an assign message 94 directly to controller B indicating that it should continue to use MSTI1. Similarly assign message 96 sent directly to controller C indicates that it should continue to use MSTI2. Having detected the use of MISTI3 by both controller A and controller D, the master controller A sends an assign message 98 directly to controller D requesting that it use MSTI4.

With multiple spanning tree instances (or with a single spanning tree instance), every node is reachable on every VLAN. However, there are two optimal schemes for routing traffic to a specific node (hereinafter referred to as schemes (1) and (2));
1) use a VLAN within the MSTI of the sending switch; or
2) use a VLAN within the MSTI of the receiving switch.

The switches learn about forwarding by observing source addresses. There is a potential learning problem if traffic sent between two nodes takes a different path (traverses different switches) in one direction (e.g., from A to B) than the other (e.g., from B to A). Frames must be seen coming from a node in order to learn how to send frames to that node. There are a few alternatives solutions to this problem of ensuring that learning is complete:

i) The controllers decide in advance which VLAN each pair of nodes will use for all communications, utilizing the same path in forward and reverse communications. For example if one node uses scheme (1) and another node uses scheme (2) a decision needs to be made on which scheme to use. This might be done with deterministic decision such as using the VLAN of the node with the larger Ethernet or Internet Protocol (IP) address, or based on the role the node plays. In essence there are two types of nodes, a "dumb" node requires the switch to tag frames, a "smart" node does the tagging itself.

ii) Both of the optimal choices are utilized by balancing traffic between schemes (1) and (2). Selection can be done per traffic flow or hashing of a function of frame IP addresses (e.g., XOR of addresses). The point of the hashing is that associated traffic follows the same network paths and does not become reordered.

iii) Only one of the schemes (either (1) or (2)) need be chosen for normal traffic, but periodic keep-alive frames are broadcast in order to train the learning. By way of further explanation, with reference to FIG. 2A, switch E does not know about switch D, as it never receives frames from D. However if D were to periodically send out broadcast frames utilizing the spanning tree indicated by FIG. 2B, switch E would become aware of D.

If the destination node VLAN is to be used then clearly it must be known by the sender which group the destination node resides in. This can be a static configuration known by all, or group membership can be included in the broadcast messages produced by each controller.

The nodes need not be aware of the VLANs or MSTIs required for optimal communication between the switches. The frame VLAN tagging process can be done automatically by the switches when receiving traffic from any of the nodes in its group. This VLAN tag insertion process can be applied even if the incoming frame has a VLAN tag, as the Ethernet format permits a frame to have multiple tags.

Note that no changes in VLAN selection are required in the case of link breakage, because the shortest path to the destination will always be on the VLAN assigned to the sender (or VLAN assigned to the receiver).

When multiple links directly connect two switches, link aggregation (IEEE 802.1 ad) can be used to bundle the multiple physical links or trunks into one logical link or trunk. This increases the capacity of a link or trunk without any impact on the approach outlined in this invention.

In another embodiment, PVST (Per-VLAN spanning tree), or PVST+ may replace MSTP.

In another embodiment a controller may control multiple switches. It is not the intent of the inventors to restrict the embodiments described herein to a controller controlling only one switch.

Although this invention is described in terms of Ethernet, one skilled in the art could apply it to any network technology in which multiple spanning trees (or similar communication restrictions) can be overlaid on a physical network topology.

The invention claimed is:
1. A networked system comprising:
a) a plurality of switches, connected to each other in a network;
b) a plurality of groups of nodes, each group connected to one of the switches;
c) a controller for each switch, each controller configured to:
periodically select a master controller from the controllers of said switches, configure the switch it controls to utilize a specific Multiple Spanning Tree Instance (MSTI), through the use of a communication protocol including "using" and "assign" messages, said master controller accepting a "using" message from each controller to determine which MSTI each controller is using, and if multiple controllers are using the same MSTI, said master controller further sending an "assign" message to one or more of the controllers using the same MSTI, which assigns the one or more of the controllers to a new MSTI, said one or more of the controllers including said master controller.

2. The system of claim 1 further comprising:
means for each controller in the network to send "using" messages to indicate which MSTI they are using.

3. The system of claim 1 further comprising means for each controller in the network to instruct the switch they control of a Virtual Local Area Network (VLAN) to be used.

4. The system of claim 1 further comprising means for each controller in the network to instruct nodes connected to the switch they control of a Virtual Local Area Network (VLAN) to use.

5. The system of claim 1 further comprising means for each switch to periodically send a keep-alive message to all switches it is aware of to aid switches in learning about each other.

6. The system of claim 1 further comprising means to utilize link aggregation.

7. A method for determining a specific Multiple Spanning Tree Instance (MSTI) to be used by a controller in a network comprising a plurality of switches connected to each other, a plurality of groups of nodes, each group connected to one of the switches, and a controller for each switch, the method comprising the steps of:
periodically electing a master controller from the plurality of controllers; and
configuring the switches in the network as to which MSTI to use through the use of a communication protocol including "using" and "assign" messages, by examining "using" messages sent to said master controller from the controllers of said switches to determine which MSTI each controller is using, and
if multiple controllers are using the same MSTI, sending "assign" messages from said master controller to one or more of the controllers using the same MSTI, which assigns the one or more of the controllers to a new MSTI, said one or more of the controllers including said master controller.

8. The method of claim 7 further comprising each controller in the network instructing the switch they control of a Virtual Local Area Network (VLAN) to be used.

9. The method of claim 7 further comprising each controller in the network instructing the switch they control of a Virtual Local Area Network (VLAN) to use.

10. The method of claim 7 further comprising each switch periodically sending a keep-alive message to all switches it is aware of to aid switches in learning about each other.

11. The method of claim 7 further comprising utilizing link aggregation.

12. A non-transitory computer readable medium comprising instructions for executing the method of claim 7 on said master controller.

* * * * *